UNITED STATES PATENT OFFICE.

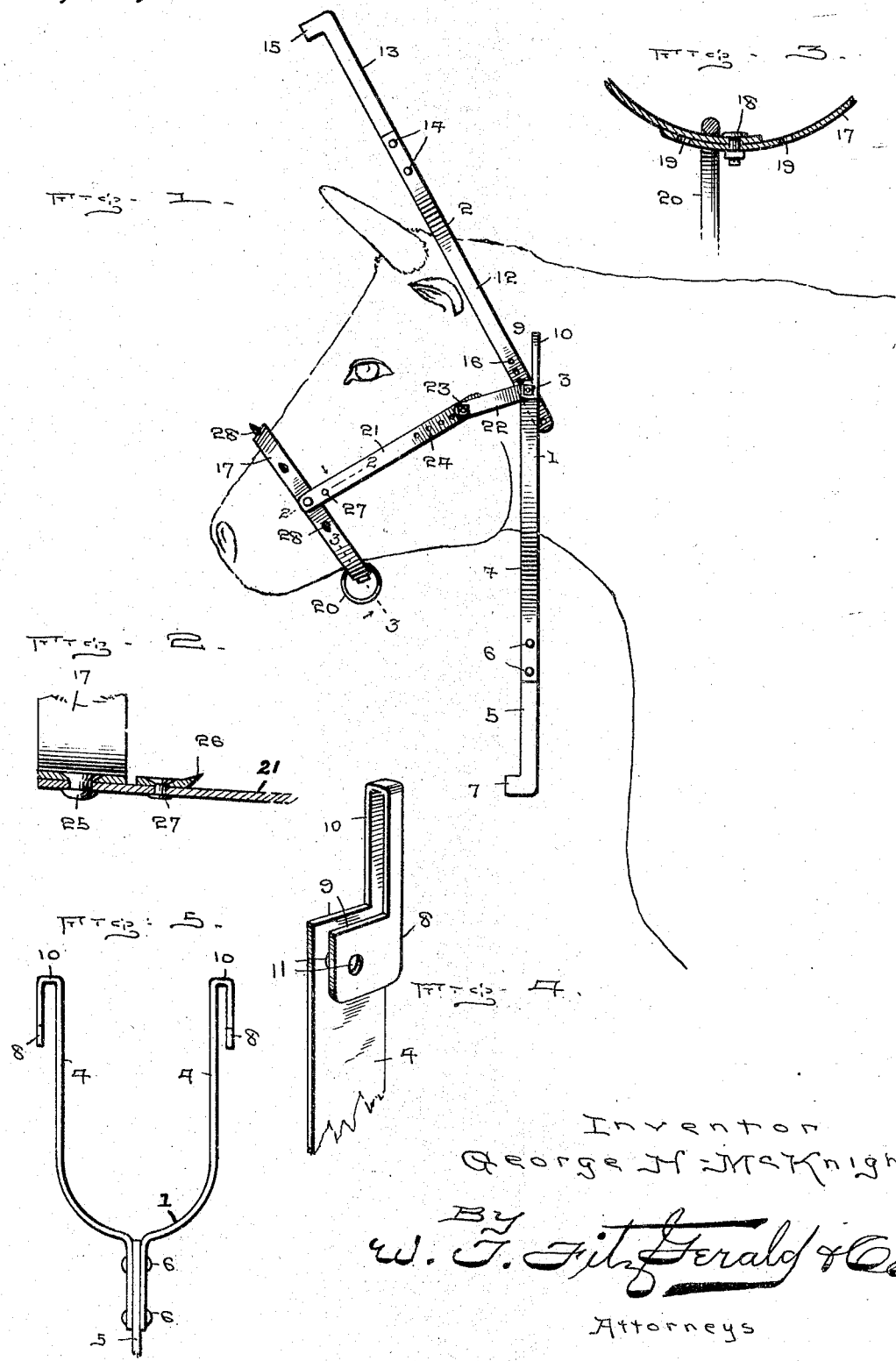
G. H. McKNIGHT.
CATTLE YOKE.
APPLICATION FILED APR. 11, 1917.
1,237,354.
Patented Aug. 21, 1917.
Inventor
George H. McKnight
By
W. T. FitzGerald & Co.
Attorneys

GEORGE H. McKNIGHT, OF CLINTON, OKLAHOMA.

CATTLE-YOKE.

1,237,354.  Specification of Letters Patent.  Patented Aug. 21, 1917.

Application filed April 11, 1917. Serial No. 161,268.

*To all whom it may concern:*

Be it known that I, GEORGE H. MC-KNIGHT, a citizen of the United States, residing at Clinton, in the county of Custer and State of Oklahoma, have invented certain new and useful Improvements in Cattle-Yokes; and I do hereby declare the following to be a full, clear, and exact description of the invention, such as will enable others skilled in the art to which it appertains to make and use the same.

This invention relates to cattle yokes and has for its object to provide a device of this character of simple and economical construction which may be readily and quickly adjusted to the head of an animal.

With this object in view the invention consists in the improved construction, arrangement and combination of parts hereinafter fully described and afterward specifically claimed.

In order that the construction and operation thereof may be readily comprehended, I have illustrated an improved embodiment of my invention in the accompanying drawings in which,—

Figure 1 is a side elevation of my novel construction of yoke shown applied to the head of a bovine animal.

Fig. 2 is a section taken on the line 2—2 of Fig. 1.

Fig. 3 is a section taken on the line 3—3 of Fig. 1.

Fig. 4 is a detail perspective view of the upper end portion of one of the forked members, and Fig. 5 is an end elevation of the upper portion of the lower forked member.

The same characters of reference are used to denote corresponding parts throughout the accompanying drawings and the following description.

Referring more particularly to the drawings, the reference numerals 1 and 2 represent a pair of forked members that are pivotally connected together at their inner ends by bolts or other suitable means 3. The forked member 1 consists of oppositely curved arms 4, the outer ends of which converge and are secured over one end of a bar 5 disposed in longitudinal alinement with the arms, by rivets or other suitable fastening devices 6. The outer free end of the bar 5 is provided with a right angular hook 7. The inner ends of each of the curved arms 4 is outwardly rebent to provide a spaced arm 8, said arms and the inner ends of the arms 4 being cut-a-way as at 9 to provide upstanding stops 10 disposed in longitudinal alinement with the forked member 1, for a purpose which will presently appear. The end of each of the arms 8 and the inner end of each of the arms 4 are provided with alining apertures 11 designed to receive one of the pivotal bolts 3.

The forked member 2, like the member 1, consists of oppositely curved arms 12, the outer ends of which converge and are secured over one end of a bar 13 by rivets or other suitable fastening means 14, and the outer end of this bar 13 is provided with a right angular hook 15. The inner ends of the oppositely curved arms 12 are each provided with a series of apertures 16 by which the members 1 and 2 may be adjusted relatively to each other through the medium of the bolts 3.

The yoke further embodies a nose band 17 which is adapted to be positioned loosely over and around the nose of the animal. This nose band 17 has its free ends adjustably connected together, as shown in Fig. 3, by a bolt 18 which is adapted to be selectively engaged through the apertures 19 in one end of the nose band. The nose band further carries a ring 20 to which a rope may be attached so that the animal can be conveniently tied up to some stationary object.

This nose band 17 is connected to the pivotal bolts 3 by bars 21 and links 22, the adjoining ends of the bars and links being adjustably connected through the medium of bolts 23 and a series of apertures 24 in the bars 21. The opposite ends of each of the links 22 is apertured to receive one of the pivotal bolts 3 when positioned between the arm 8 and the inner end of the arm 4. The opposite ends of each of the bars 21, is connected to the nose band by a rivet or other securing means 25.

Each of the bars 21 has attached to its inner side and adjacent the nose band 17 a suitable barb 26 through the medium of a rivet or other fastening means 27. The sharpened ends of each of these barbs projecting inwardly and rearwardly of the device for a purpose which will presently appear.

As shown the yoke is designed to be positioned upon the head of the animal so that the forked members 1 and 2 will rest conveniently and comfortably behind the jaws of the animal and when so positioned the nose band 17 will be positioned loosely around the animal's nose so that the barbs 26 will not prick the animal's flesh. Should the animal try to force its head through a fence, the bars 5 and 13 of the yoke members 1 and 2 will come into contact with the wires or other members of the fence and as the animal moves its head forwardly the fork members 1 and 2 will be swung into longitudinal alinement with each other and by a forward movement of the animal's head, the forked members of the yoke will be moved rearwardly of the animal's head, thus drawing the nose band up on the animal's nose until the barbs 26 prick its flesh which will serve to prevent any further attempt of the animal to get through or over the fence. From this it will be apparent that the harder the animal forces or shoves its head through or against the fence, the further the barbs 26 will be forced into its flesh.

It is to be further noted from the foregoing description that the ends of each of the links 22 and the inner ends of each of the oppositely curved arms 12 are positioned between each of the arms 8 and the inner end of each of the oppositely curved arms 4, and when the forked member 2 is swung upwardly into alinement with the member 1, the stops 10 will serve to limit the swinging movement of the member 2 with the respect to the member 1. When the forked members 1 and 2 are swung into alinement with each other they may be moved rearwardly of the animal as a single rigid structure in order to draw the nose band up on the animal's nose.

It is to be further noted by reference to Fig. 1, that the nose band 17 is provided with outwardly projecting barbs 28 which serve to prevent the cow from nursing herself.

What I claim is:

A yoke comprising a pair of forked members pivotally and adjustably connected together, means for limiting the rearward swinging movement of said forked members to positions in alinement with each other, a nose band, means for adjustably connecting the nose band with the pivotal point of the forked members, and rearwardly projecting barbs on the connecting means adapted to be drawn into engagement with an animal's head when the forked members are moved rearwardly together.

In testimony whereof I have signed my name to this specification in the presence of two subscribing witnesses.

GEORGE H. McKNIGHT.

Witnesses:
V. F. CARLTON,
R. V. HENRY.

Copies of this patent may be obtained for five cents each, by addressing the "Commissioner of Patents, Washington, D. C."